(12) United States Patent
Abramson

(10) Patent No.: US 6,529,980 B1
(45) Date of Patent: *Mar. 4, 2003

(54) SUPERPOSITION OF HOST BRIDGE STATUS ONTO AN EXISTING REQUEST/GRANT SIGNALING PROTOCOL

(75) Inventor: Darren L. Abramson, Folsom, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/784,199

(22) Filed: Jan. 15, 1997

(51) Int. Cl.[7] ................................. G06F 1/00
(52) U.S. Cl. ................... 710/108; 710/110; 710/309
(58) Field of Search ................... 395/288, 287, 395/290, 292, 309, 308, 300, 856–857, 726; 710/108, 107, 110, 113, 119, 305, 309, 314

(56) References Cited

U.S. PATENT DOCUMENTS

| | | | | |
|---|---|---|---|---|
| 5,533,204 A | * | 7/1996 | Tipley | 395/288 |
| 5,559,968 A | * | 9/1996 | Stancil et al. | 395/306 |
| 5,596,729 A | * | 1/1997 | Lester et al. | 395/308 |
| 5,625,779 A | * | 4/1997 | Solomon et al. | 395/293 |
| 5,708,794 A | * | 1/1998 | Parks et al. | 395/481 |
| 5,717,873 A | * | 2/1998 | Rabe et al. | 395/290 |
| 5,717,876 A | * | 2/1998 | Robertson | 395/309 |
| 5,737,545 A | * | 4/1998 | Wszolek et al. | 395/288 |

* cited by examiner

*Primary Examiner*—Peter Wong
*Assistant Examiner*—Raymond N Phan
(74) *Attorney, Agent, or Firm*—Blakeley, Sokoloff, Taylor & Zafman LLP

(57) ABSTRACT

A protocol for superimposing status information onto an arbitration scheme between a first bus agent and a second bus agent. One embodiment of the arbitration scheme uses a grant signal and a request signal to arbitrate for use of a bus. The second bus agent may request to use the bus by asserting a request signal, which is received by a bus arbitration circuit. The bus arbitration circuit may or may not reside within the first bus agent. The bus arbitration logic acknowledges the request by asserting a grant signal, which is received by the second bus agent. A specific relationship between an address phase and the arbitration signals allows the first bus agent to pass status information to the second bus agent via the grant signal. The specific relationship between an address phase and the arbitration signals is a condition that typically does not occur where the arbitration signals are used to arbitrate for use of the bus.

24 Claims, 10 Drawing Sheets

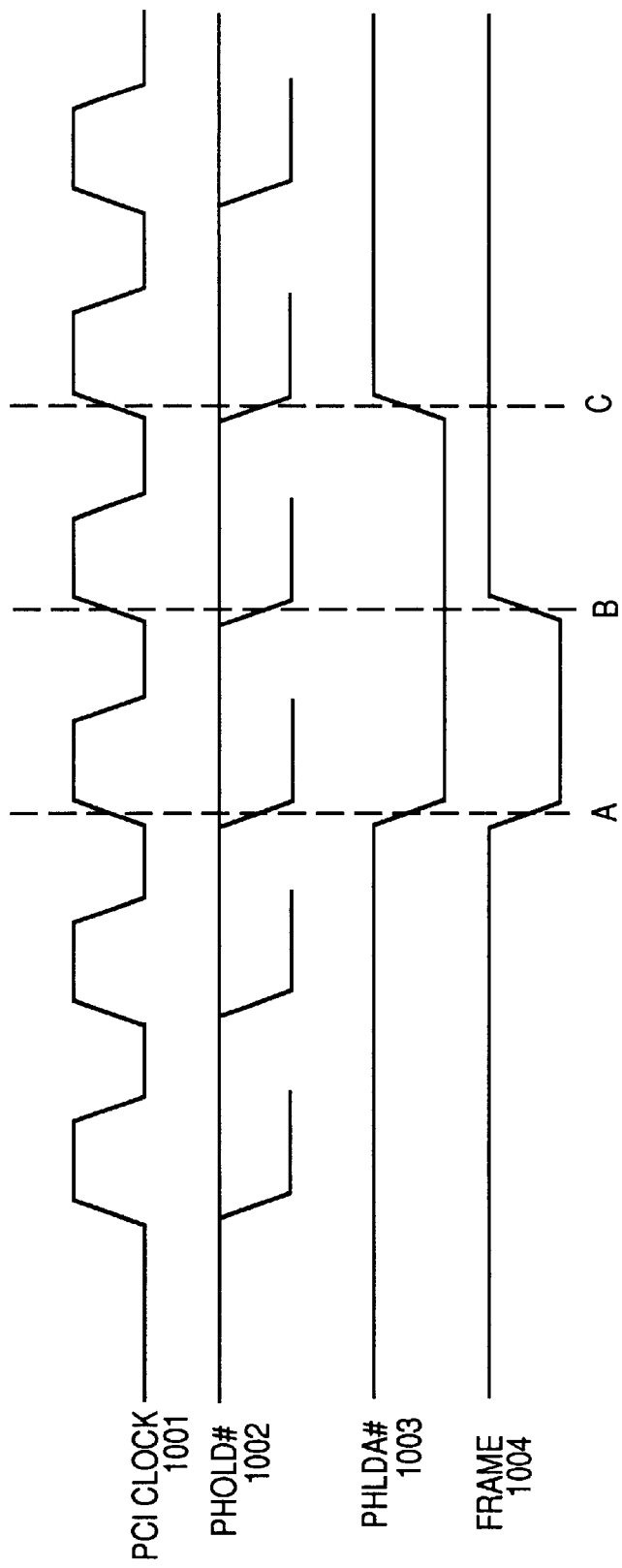

SUPERPOSITION OF HOST BRIDGE STATUS ONTO AN EXISTING REQUEST/GRANT SIGNALING PROTOCOL

FIELD OF THE INVENTION

The present invention relates to the field of computer systems. More specifically, the present invention relates to an arbitration scheme between multiple bus agents

BACKGROUND OF THE INVENTION

In addition to including a host bus and a memory bus, many computer systems include an Industry Standard Architecture ("ISA") bus, a Peripheral Component Interconnect ("PCI") bus, or both an ISA and a PCI bus. Peripheral or memory devices that are compatible with the ISA bus may be coupled to the computer system through the ISA bus while peripheral or memory devices that are compatible with the PCI bus may be coupled to the computer s stem through the PCI bus. Typically, the devices coupled to a bus are referred to as bus agents. A bus agent may be a bus master (i.e., a bus agent that initiates a bus transaction) or a target agent (i.e., a bus agent that is the target of the bus transaction initiated by the bus master agent). When a PCI bus is added to a system that already includes an ISA bus, the PCI bus may be referred to as an intermediate or local bus. As more buses are added to a computer system, a more complex arbitration scheme may need to be implemented in order to maintain system coherency.

FIG. 1 illustrates a computer system 100 that includes an ISA Bus 108. The central processing unit 101 ("CPU") is coupled to the Host-to-ISA ("Host-ISA") Bridge 102 , via the Host Bus 106, and the Main Memory 103 is coupled to the Host-ISA Bridge 102 via the Memory Bus 105. The Host-ISA Bridge 102 includes the Arbitration Logic 104. When an ISA direct memory access ("DMA") Agent, such as Agent 107, requests DMA service in order to access the Main Memory 103, the ISA DMA Agent 107 asserts the request line 113 ("DREQ"), and subsequently, the Host-ISA Bridge 102 asserts the hold line 111 ("HOLD"). When the CPU 101 returns an asserted hold acknowledge line 110 ("HOLDACK"), the Host-ISA Bridge 102 is informed that the CPU 101 will no longer initiate cycles from the CPU 101 to the Main Memory 103 or ISA Bus 108. The Host-ISA Bridge 102 then proceeds to assert the acknowledge line 112 ("DACK#") to inform the ISA DMA Agent 107 that the DMA transaction is now beginning.

The computer system 100 requires a relatively simple arbitration scheme because there are only, two possible types of masters—the CPU and the ISA agents. Typically, in the computer system 100, any potential flushes (i.e., buffered writes from the CPU are transferred to their target ISA agents before granting the ISA agent bus mastership) may be performed by the Host-ISA Bridge 102. This buffering policy typically does not run into the condition where an ISA DMA Agent 107 cannot access the Main Memory 103.

On the other hand, when an intermediate bus, such as the PCI Bus 209, is interposed between the ISA Bus 214 and the CPU 201, the arbitration scheme may also be required to ensure system coherency. This type of arbitration scheme may be more complex because under certain conditions, an ISA agent may not be able to access the main memory without causing system failure conditions, such as system deadlock or system livelock. FIG. 2 illustrates a computer system 200 that includes both a PCI bus 209 and an ISA bus 214.

The Host-to-PCI ("Host-PCI") Bridge 202 is coupled to the CPU 201 via the Host Bus 204 and to the Main Memory 203 via the Memory Bus 205. The Main Memory 203 may be dynamic random access memory ("DRAM") for providing dynamic storage for run-time computer events. The PCI arbiter 207 and the CPU-to-PCI Buffer 208 resides within the Host-PCI Bridge 202. The PCI arbiter 207 arbitrates the use of the PCI bus 209 and the CPU-to-PCI Buffer 208 is used to buffer data writes (i.e., posted writes) from the CPU 201 which are destined for the PCI bus 209 or ISA Bus 214. Typically, the PCI agent 206 receives PCI bus mastership after the PCI agent 206 asserts the request line 223 ("REQ#), and subsequently, the PCI Arbiter 207 asserts the grant line 222 ("GNT#) which is received by the PCI agent 207.

The Host-PCI Bridge 202 is coupled to the PCI agents via the PCI Bus 209. For example, the PCI Master Agent 206 and the PCI Target Agent 211 may reside on the PCI Bus 209. Other PCI agents may also reside on the PCI Bus 209. The PCI Bus, 209 is referred to herein as a "pre-emptible" bus because it may suspend the operation of one PCI agent when another operation from another PCI gent demands use of the PCI bus 209 to access the various system resources.

The PCI-to-ISA ("PCI-ISA") Bridge 210 is coupled to the PCI Bus 209 to provide an expansion bridge for an ISA Bus 214. The ISA Bus 214 is referred to herein as a "non-pre-emptible" bus because when an ISA agent, such as the ISA DMA Agent 213, is granted access to the ISA Bus 214, the computer system locks out all other agents and all other buses, as well as the CPU 201 and the Main Memory 203, until the transaction for which the ISA agent was granted access has been entirely completed. This lock out feature of the ISA Bus 214 may be referred to as guaranteed access timing because the ISA agent is guaranteed system ownership for undefined periods of time w th guaranteed DRAM access.

The ISA Arbiter 212 may reside with the PCI-ISA Bridge 210 and may be used to arbitrate for he use of the ISA Bus 214. Various agents, such as the ISA DMA Agent 213 and the ISA Target Agent 215, may reside on the ISA Bus 214. Other ISA agents may also reside on the ISA Bus 214. Typically, the ISA DMA Agent 213 may access the Main Memory 203 after the ISA DMA Agent 213 asserts the request line 224 ("DREQ") and subsequently, the PCI-ISA Bridge 210 asserts the acknowledge or grant line 225 (DACK#) which is received by the ISA DMA Agent 213.

Unfortunately, when a pre-emptible bus, such as the PCI Bus 209 and a non-pre-emptible bus, such as an ISA Bus 214, are both incorporated into a compute system, failure conditions (e.g., system livelock and deadlock) may arise in which the ISA DMA Agent 213 may not be able to access the Mail Memory 203. For example, the ISA DMA Agent 213 may not access the Main Memory 203 for reads when the Host-PCI Bridge 202 is storing posted writes in the CPU-to-PCI Buffer 208. However, once the CPU-to-PCI Buffer 208 has completed all writes to the destined target agent(s), the ISA DMA Agent 213 may then access the Main Memory 203. As such, these types of failure conditions may be eliminated by providing a unique arbitration scheme between the PCI-ISA Bridge 210 and the Host-PCI Bridge 202.

Rather than incorporating the arbitration scheme that uses the PCI bus REQ# and GNT# signals as defined in the specification published by the PCI Special Interest Group in Portland, Oreg. (such as revisions 1.0 (1992) and 2.0 (1993) and 2.1 (1993)) the Host-PCI Bridge 202 and the PCI-ISA Bridge 210 may use the signals PHOLD# and PHLDA# which may be defined as PCI bus sideband signals. Typically, a sideband signal is defined as a signal that is not compliant with the PCI bus specification and is used to interconnect two or more PCI agents. In addition to providing the same functionality (i.e., request and grant) as the REQ# and GNT# signals, the PHOLD# signal and the PHLDA# signal provides the additional functionality of ensuring that the CPU-to-PCI Buffer 208 is flushed prior to granting PCI bus mastership to the PCI-ISA Bridge 210 in order to maintain system coherency. The PHOLD# and the PHLDA# signals are described below.

FIG. 3 illustrates a DMA operation requested by the ISA DMA Agent 213. The ISA DMA Agent 213 asserts the DREQ signal 304 when it is requesting data transfers involving the Main Memory 203 (see time index A). The PHOLD# signal 301 is asserted in response to the assertion of the DREQ signal 304, as shown by the arrow 310 (see time index B).

In response to the assertion of the PHOLD# signal 301, the PHLDA# signal 302 is asserted (see time index C). During the period between the time indexes B and C, the Host-PCI Bridge 202 performs various functions (i.e., flushing and disabling the CPU-to-PCI Buffer 208) to ensure that once the PCI-ISA Bridge 210 receives ownership of the PCI Bus 209, the PCI-ISA Bridge 210 has guaranteed access to the Main Memory 203. In other words, the Host-PCI Bridge 202 may prevent system deadlock conditions from occurring.

Once the PHLDA# signal 302 is asserted by the PCI arbiter 207 in the Host-PCI Bridge 202 and received by the PCI-ISA Bridge 210, the ISA Arbiter 212 asserts the DACK# signal 305 (see time index D) some time later. The assertion of the DACK# signal 305 informs the ISA DMA Agent 213 that its DMA request has been granted. Following the assertion of the DACK# signal 305, the four bytes of data written on the ISA Bus 214 (shown by waveform 306) are then written onto the PCI Bus 209 (shown by the waveform 303) before being written into the Main Memory 203. The four bytes of data shown by waveform 306 may be referred to as a Dword (e.g., 32 bit quantity). During a DMA transaction, other quantities of data may be passed to the Main Memory 203 via the PCI bus 209. When the ISA DMA Agent 213 has completed its DMA transaction over the ISA Bus 214, the DREQ signal 304 is deasserted. The deassertion of the DREQ signal 304 triggers the deassertion of the DACK# signal 305 (shown by the arrow 314). The deassertion of the DACK# signal 305 then triggers the deassertion of the PHOLD# signal 301 (shown by the arrow 316) at the time index E. Subsequently, at the time index F, the PHLDA# signal 302 is deasserted.

When the PHLDA# signal 302 is asserted (i.e., the period between the time index C and the time index F), the PCI Bus 209 may not respond to other requests to use the PCI Bus 209. For one embodiment, the latency period between the time index C and the time index D may be between 10–20 PCI clock cycles (i.e., 330–660 nanoseconds ("ns")). Furthermore, the ISA Bus 214 may take approximately 6 ISA clock cycles at 120 ns each (i.e., 720 ns) to write each of the four bytes of data onto the ISA Bus 214. Thus, other components in the system may not have access to the PCI Bus 209 for approximately 1 microsecond (i.e., 33 PCI clock cycles per byte). In other words, the assertion of the PHLDA# signal ensures that the ISA DMA Agent 213 is guaranteed exclusive access of all system resources and assumes that the computer system 200 can perform no operation other than the ISA transaction from the time index C to the time index F.

By tying up the PCI Bus 209 while the ISA DMA Agent 206 is attempting to access the Main Memory 203, the overall performance of the computer system 200 may be degraded. For example, although the PCI Bus 209 may operate at 33 Megahertz ("MHz") and the ISA bus 214 may operate at 8 MHz, when a DMA operation is being performed by the DMA ISA Agent 213, the PCI Bus 209 may not operate at its optimal speed due to this latency on the PCI Bus 209.

The PHOLD# and PHLDA# arbitration scheme may use a "passive release" mechanism to improve the latency on the PCI Bus 209 while the ISA DMA Agent 213 attempt to access the Main Memory 203. In general, the passive release mechanism allows the Host-PCI Bridge 202 to rearbitrate to other PCI agent s while the PCI-ISA Bridge 210 still owns the bus. More specifically, the data stream originated from the ISA Bus 214 may be partitioned into segments such that wait states may be introduced between the partitioned segments. During these wait states, rearbitration may occur such that the PCI Bus 209, the CPU 201, and the Main Memory 203 may perform other PCI Bus, CPU, and memory operations during a DMA operation performed by the ISA DMA agent 213.

FIG. 4 illustrates one embodiment of a passive release protocol implemented with the PHOLD# and PHLDA# arbitration scheme during a DMA operation by the ISA DMA Agent 213. The assertion of the DREQ signal 404 (at time index A) triggers the assertion of the PHOLD# signal 401 (at time index B). Prior to asserting the PHLDA# signal 402, the Host-PCI Bridge 202 typically flushes the CPU-to-PCI Buffer 208 in order to ensure the PCI-ISA Bridge 210 has guaranteed access to the Main Memory 203 when it becomes the PCI bus master. Thus, the PHLDA# signal 402 is asserted after the emptying end disabling of the CPU-to-PCI Buffer 208.

The passive release protocol is implemented by deasserting the PHOLD# signal 401 for a single PCI clock cycle (i.e., between time index C and D). This may be referred to as a passive release semantic. During this release period, the passive release semantic frees the PCI Bus 209, the Host Bus 204, and the Main Memory Bus 205 to allow other PCI bus masters to use the PCI Bus 209 while maintaining the CPU-to-PCI Buffer 208 flush mechanism. Between the time index D and E, PCI arbitration ("PCI re-arb") begins anew. When the PCI-ISA Bridge 210 wins the PCI re-arb, and the ISA Bus 214 is ready to transfer the one-byte segment to the PCI Bus 209 (at the time index E), the one-byte segment of data is transferred across the PCI Bits 209 and written into the Main Memory 203 (between the time index E and F).

Subsequent to the transfer of the one-byte segment over the PCI Bus 209, a passive release semantic is once again issued to free up the PCI Bus 209, the Host Bus 204, and the Main Memory Bus 205 for other operations (at time index F). For one embodiment, the remaining three one-byte segments are written into the Main Memory 203 in the same manner as the first one-byte segment. When all four bytes have been transferred and the ISA DMA transaction is completed, as indicated by the ISA DMA Agent 213 deasserting the DREQ signal 404, the deassertion of the DACK# signal 405 is triggered at the time index H. Subsequently, the deassertion of the DACK# signal 405 triggers the deassertion of the PHOLD# signal 401 at the time index J. After winning the PCI re-arb that occurs between the time indexes G and I, an active release semantic is signaled by the deassertion of the PHOLD# signal 401 for a minimum of two consecutive PCI clock cycles (not shown). This active release semantic releases all of the uses and re-enables writes to the CPU-PCI Buffer 208.

Although a passive lease protocol has been incorporated into the PHOLD# and the PHLDA# arbitration scheme, the PHOLD# and PHLDA# arbitration scheme does not use the PHOLD# and PHLDA# signals to transfer information known by the Host-PCI Bridge 202 to the PCI-ISA Bridge 210. This information may be referred to as status information.

SUMMARY OF THE INVENTION

A computer system is described. The computer system includes a first bus coupled to a first bus agent, a second bus agent, and a bus arbitration circuit. The first bus agent is configured to generate a first arbitration signal and the bus arbitration circuit is configured to generate a second arbitration signal. During a transaction initiated by the first bus agent, an asserted second arbitration signal indicates the first bus agent is granted ownership of the first bus. During a transaction initiated by the second bus agent, an asserted second arbitration signal indicates a first state of a status information and a deasserted second arbitration signal indicates a second state of the status information.

A method of superimposing status information from a first bridge onto an arbitration signal received by a second bridge is described. A first arbitration signal is deasserted during at least a first clock cycle, if necessary. During at least the first clock cycle, a second arbitration signal is asserted and an address phase is provided. During at least a second clock cycle, the second arbitration signal is deasserted to indicate a first state of the status information or asserted to indicate a second state of the status information.

Other desires, feature, and advantages of the present invention will be apparent from the accompanying drawings and from the detailed description that follows below.

BRIEF DESCRIPTION OF THE DRAWINGS

The present invention is illustrated by way of example and not limitation in the figures of he accompanying drawings, in which like references indicate similar elements and in which:

FIG. 10 illustrates a condition when the address phase and the arbitration signals are used to pass a second state of the status information for one embodiment.

DETAILED DESCRIPTION

The arbitration scheme between a host bridge and an expansion bridge in a computer system may also be used to pass information known by the host bridge to the expansion bridge. Typically, an arbitration scheme includes a request signal and a grant signal. For one embodiment, the arbitration scheme may include the request signal PHOLD# and the grant signal PHLDA#. The PHOLD# signal and the PHLDA# signals may be referred to sideband signals for the PCI Bus. Generally, a sideband signal is defined as a signal that does not comply with the PCI bus specification published by the PCI Special Interest Group in Portland, Oreg. (such a revisions 1.0 (1992) and 2.0 (1993) and 2.1(1993)) and may be used to interconnect two or more PCI agents.

Typically, the host bridge is coupled to the expansion bridge via an intermediate bus, such as the PCI Bus. The PHOLD# signal may be asserted by the expansion bridge when the expansion bridge is requesting use or ownership of the intermediate bus. Furthermore, the PHLDA# signal may be asserted by t e arbitration logic and received by the expansion bridge when its request has been granted. Typically, the PHOLD# and PHLDA# arbitration protocol requires the host bridge to perform various operation to ensure the expansion bridge will have guaranteed access to the PCI bus prior to asserting the PHLDA# signal. For one embodiment, the arbitration logic for the intermediate bus may reside within the host bridge. For an alternative embodiment, the arbitration logic may reside in another PCI agent.

Figure 1:
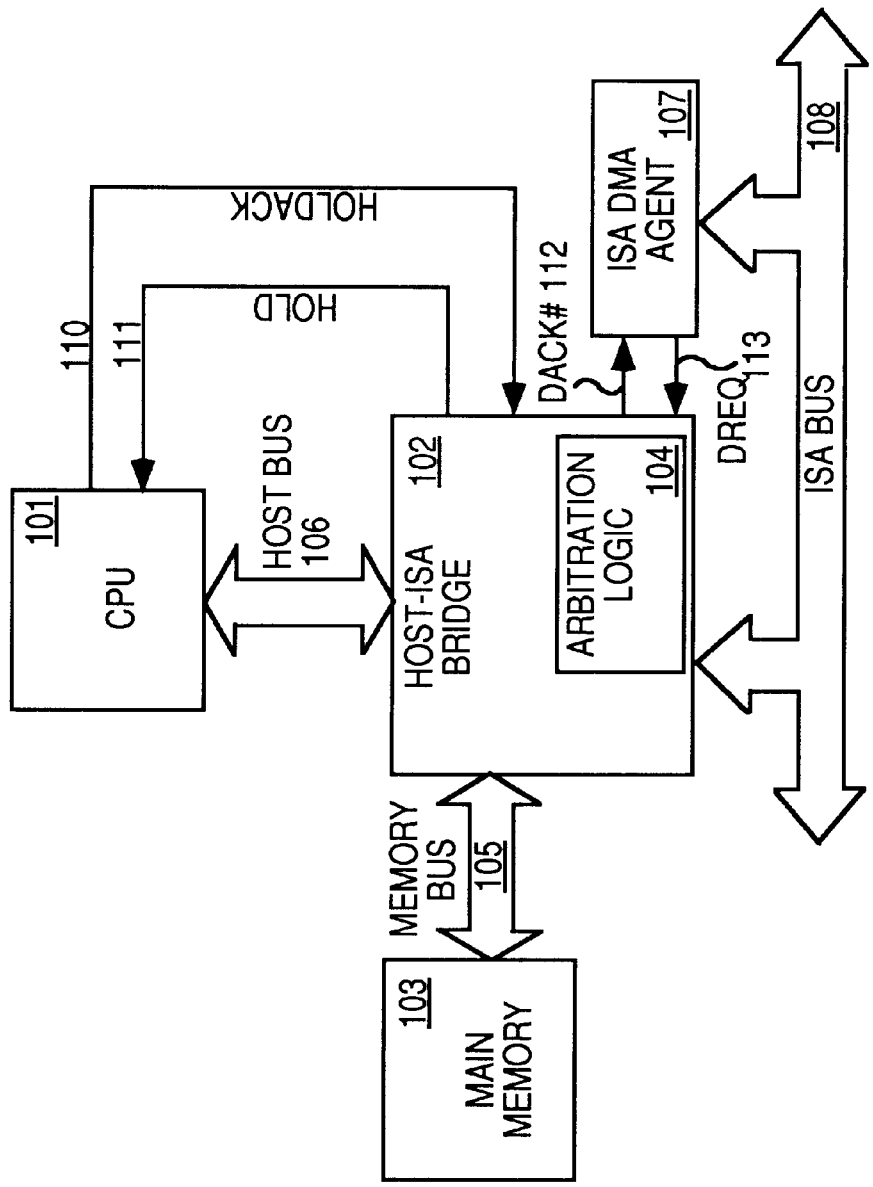
FIG. 1 illustrates a prior art computer system having an ISA bus.
Figure 2:
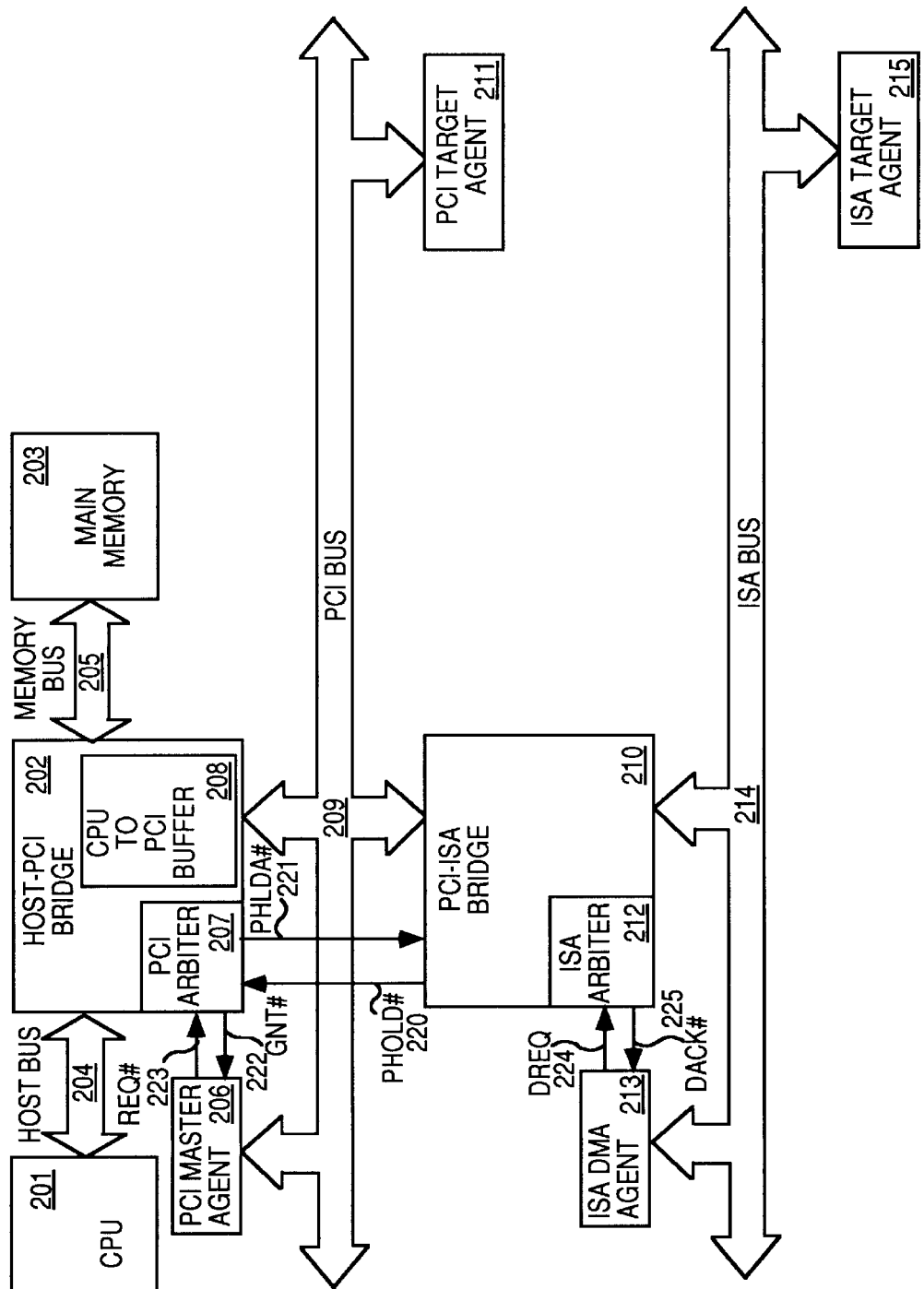
FIG. 2 illustrates a prior art computer system having a PCI bus and an ISA bus.
Figure 3:
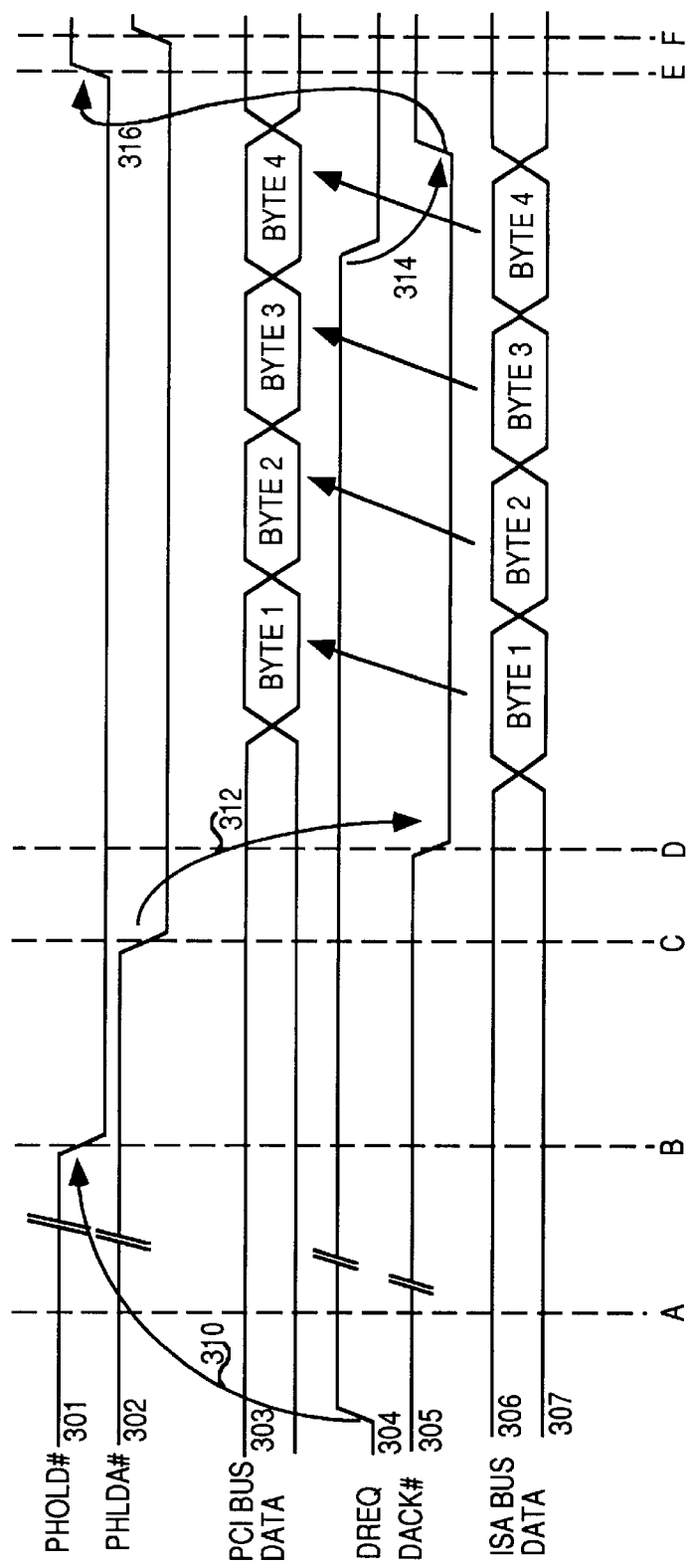
FIG. 3 illustrates a waveform illustrating a prior art arbitration protocol.
Figure 4:
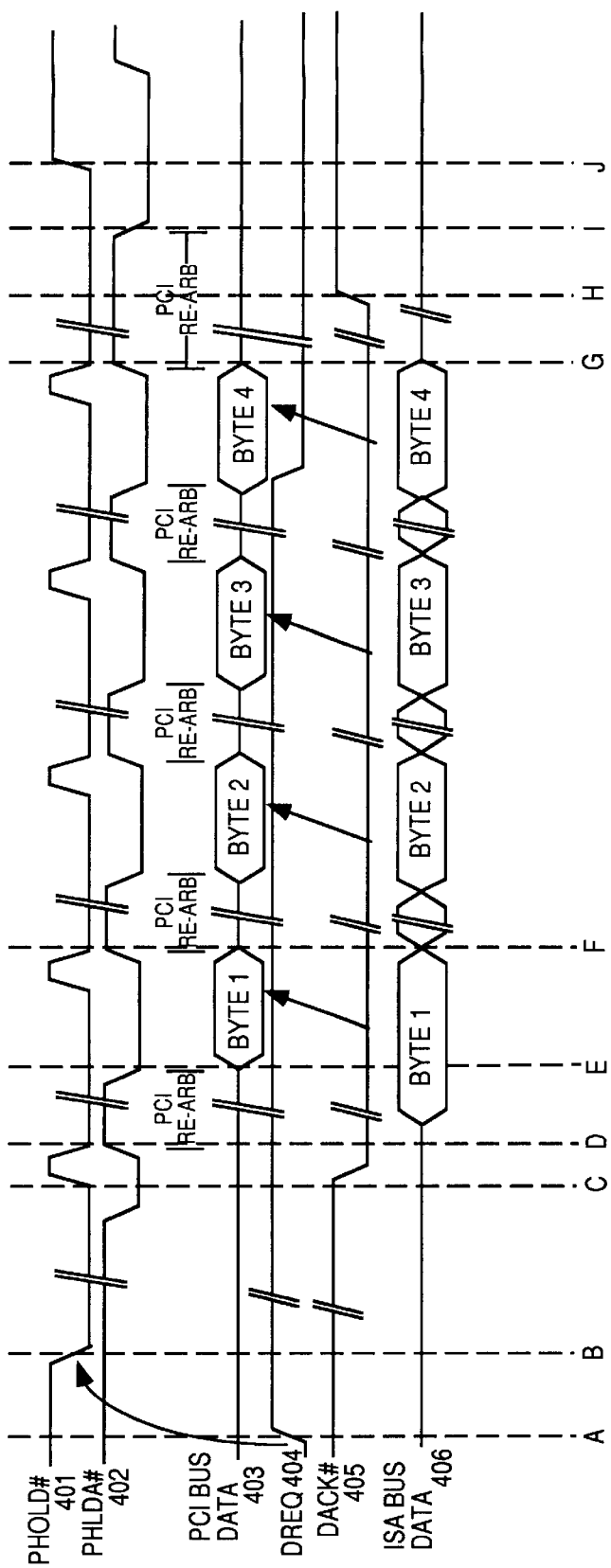
FIG. 4 illustrates a waveform illustrating a prior art passive release protocol.
Figure 5:
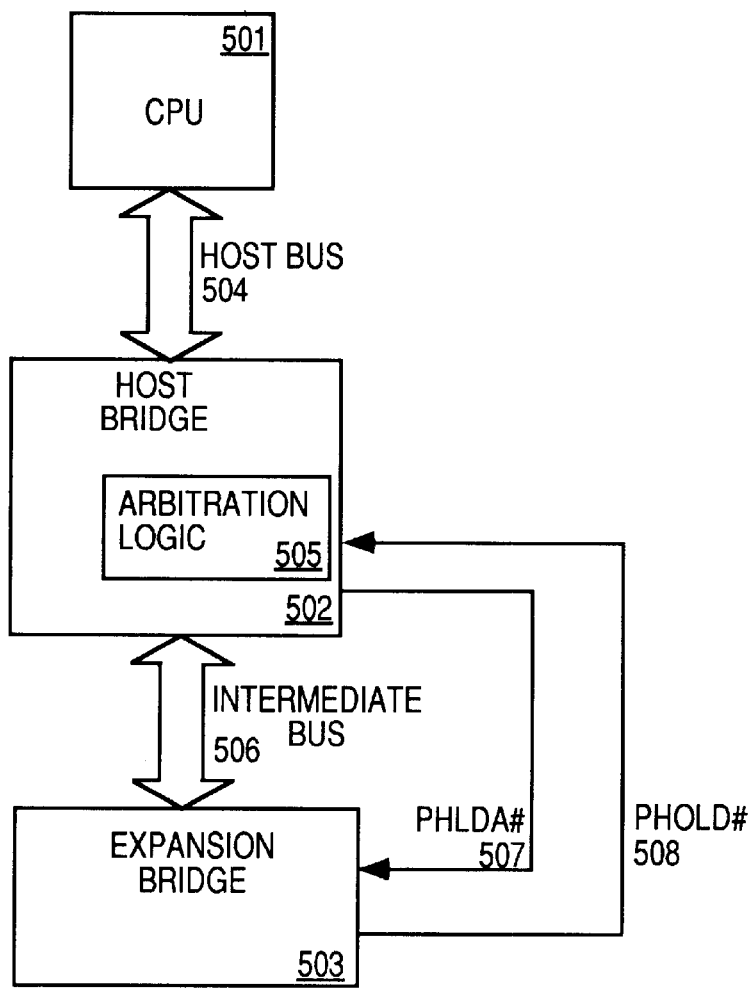
FIG. 5 illustrates one embodiment of a computer system that may incorporate that may a protocol for superimposing status information on an arbitration scheme.

FIG. 5 is a block diagram of a portion of a computer system 500. The computer system 500 ay include the CPU 501 coupled to the Host Bridge 502 through the Host Bus 504. The Arbitration Logic 505 for the Intermediate Bus 506 may r side within the Host Bridge 502 as shown in FIG. 5. For alternative embodiments, the Arbitration Logic 505 may not reside within the Host Bridge 502. The Intermediate Bus 506 may couple the Host Bridge 502 to the Expansion Bridge 503. The Intermediate Bus 506 may allow expansion type agents (e.g.,. memory or peripheral devices) to be pi on a slower frequency bus than the Host Bus 504 such that the Host Bus 504 may be used exclusively or predominantly by the CPU 501. The Expansion Bridge 503 typically asserts the PHOLD# line 507 when requesting ownership of the Intermediate Bus 506. In response to an asserted PHOLD# line, the Host Bridge 502 typically provides an asserted PHLDA# line 507 to inform the Expansion Bridge 503 that it has been granted ownership of the Intermediate Bus 506.

For one embodiment the Intermediate Bus 506 may be a PCI bus, and therefore the Host Bridge 502 may be referred to as a HOST-PCI Bridge. As mentioned above, the PCI bus may be a pre-emptible bus. For one embodiment, the Expansion Bridge 503 couples the PCI bus to an ISA bus (not shown) and there ore may be referred to as a PCI-ISA Bridge. Also mentioned above, th ISA bus may be a non-pre-emptible bus. For one embodiment, an arbitration protocol allows status information about the Host Bridge 502 (or known to the Host Bridge 502) to be sent on the PHOLD#and the PHLDA# signals. Although the PHOLD# and PHLDA# signals may be used in one embodiment, other request and grant signals (i e, a different arbitration protocol) may be used in alternative embodiments.

For one embodiment the Intermediate Bus 506 allows a master agent to perform a series of accesses to a particular memory target agent with the assurance that no other master agent will access the same target agent until the master agent's series of accesses have been completed (i.e., locked out). This is often referred to as an atomic series of transactions and may be implemented with a LOCK# pin.

The PCI bus may implement a locking mechanism via a PCI LOCK# signal. Typically, there is only one LOCK# signal and only one master agent can use it at time. In other words, only one master agent may perform a locked transaction series during a given period. If a master agent wishes to use the LOCK# signal to reserve a target agent for its exclusive access, the master agent first determines that the LOCK# signal is not already in use by another master agent. Then, if the LOCK# is not currently being used it may then assert the LOCK# signal. The PCI bus specification (e.g., revision 2.1) may require that if the PCI locking mechanism is implemented in the computer system, then all PCI agents must comply with this locking mechanism. This often requires all PCI agents to include circuitry to implement the functionality of the locking mechanism and a LOCK# pin. For an alternative embodiment, the locking mechanism may be used with various other types of intermediate busses.

Figure 6:
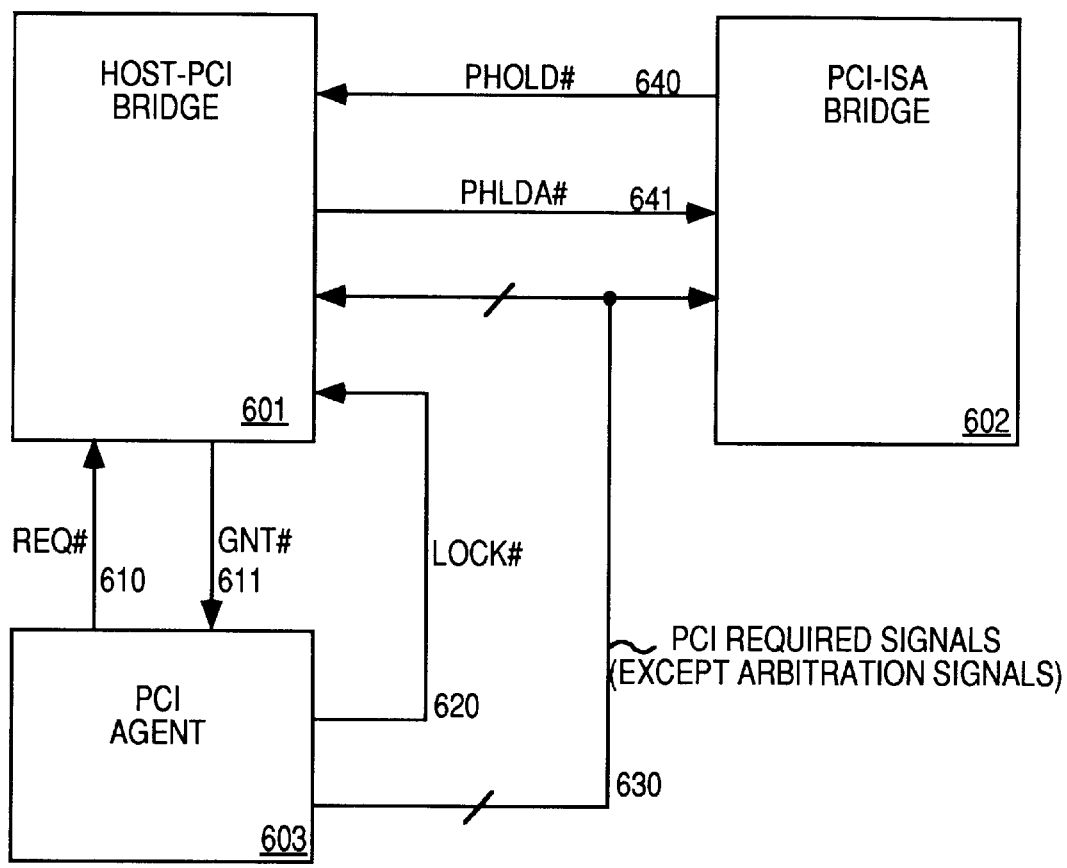
FIG. 6 illustrates o e embodiment of a computer system that may use a protocol for superimposing lock status information on an arbitration scheme.

For one embodiment, the arbitration signals PHOLD# and PHLDA# may be used to provide the lock status information to the Expansion Bridge 503, rather than including an additional LOCK# pin and additional lock circuitry associated with the LOCK# pin. FIG. 6 illustrates in block diagram form the use of the arbitration signals (i.e., PHOLD# and PHLDA#) to provide the lock status information to the Expansion Bridge. According to FIG. 6, the Host-PCI Bridge 601 represents a host bridge ant the PCI-ISA Bridge 602 represents an expansion bridge.

The PCI bus is gene ally represented by the transmission lines 630. The transmission lines 630 may include all the required PCI signals (as defined by the PCI specification) except for the arbitration lines. Thus, the transmission lines 630 may include the Address/Data and Command signals (i.e., AD[31:0], C/BE#[3:0], and PAR), the Interface Control signals (i.e., FRAME#, TRDY#, IRDY#, STOP#, and DEVSEL#), the System signals (i.e., CLK and RST#), and the Error Reporting signals (PERR# and SERR#). Furthermore, the transmission lines 630 may include various optional signals (allowed by the PCI standard, rev. 2.1). According to FIG. 6, the transmission lines 630 may be coupled to the Host-PCI Bridge 601, the PCI-ISA Bridge 602, and the PCI Agent 603.

Typically, each PCI master agent has a pair of arbitration lines that connect directly to the PCI bus arbiter which may be located within the Host-PCI Bridge 601. When a master agent requires the use of the PCI bus, it asserts its device-specific request line to the PCI arbiter. When the PCI arbiter has determined that the requesting master agent should be granted control of the PCI bus, it asserts the grant line specific to the requesting master agent.

Although FIG. 6 shows one PCI agent (i.e., PCI Agent 603), other PCI agents may be coupled to the PCI bus in a similar manner as the PCI Agent 603. According to FIG. 6, the PCI Agent 603 may use the standard PCI arbitration signals to obtain ownership of the PCI bus. The PCI Agent 603 may request use of the PCI bus by asserting the REQ# line 610 and the PCI arbiter (located within he Host-PCI Bridge 601) may acknowledge this request by asserting the GNT# line 611. On the other hand, the PCI-ISA Bridge 602 may use a pair of sideband arbitration signals to become the PCI bus master. The PCI-ISA Bridge 602 may request use of the PCI bus by asserting the PHOLD# line 640 and the PCI arbiter may acknowledge this request by asserting the PHLDA# line 641. As mentioned above, the PHOLD# and PHLDA# arbitration scheme may perform additional operations to ensure system coherency before granting the PCI-ISA Bridge 602 access to the PCI bus.

For one embodiment, the locking mechanism described above has been implemented in the s stem shown in FIG. 6. The Host-PCI Bridge 601 receives the lock status information from the PCI Agent 603 via the LOCK# line 620. Typically an asserted LOCK# signal indicates that the PCI Agent 603 has a lock (exclusive access) on a specific target agent (not shown) and a deasserted LOCK# signal indicates that the PCI Agent 603 does not have a lock on a target agent.

In order to comply with the PCI specification (e.g., revision 2.1), the PCI-ISA Bridge 602 may be required to receive the lock status information. Furthermore the lock status information may be advantageous if other coherency mechanisms exist. The embodiment shown in FIG. 6 illustrates that the PCI-ISA Bridge 602 may not receive a LOCK# signal via a dedicated LOCK# line or LOCK# pin. For one embodiment, the Host-PCI Bridge 601 may provide the lock status information to the PCI-ISA Bridge 602 via the PHOLD# line 640 and the PHLDA# line 641. In other words, the lock status information is superimposed on the existing arbitration signals (i.e., PHOLD# and PHLDA#). Thus, the requirement for a separate LOCK# line may be eliminated, and furthermore, the circuitry to implement the functionality of the LOCK# signal may be eliminated. For alternative embodiments, the status information superimposed on the PHOLD# signal and the PHLDA# signal may represent other types of status information such as buffer status, configuration status, power management information, and if the CPU is executing code from the system management mode ("SMM") memory space due to a system management interrupt ("SMI").

As noted above, each PCI master agent has a pair of arbitration lines (i.e., a grant line and request line) that connect directly to the PCI bus arbiter. Typically, the PCI bus arbiter is located within the Host-PCI Bridge. The arbitration lines may be the standard REQ# and GNT# defined by the PCI bus specification or may be sideband lines such as the PHOLD# and PHLDA# line described above. Typically, the PCI bus arbiter allows only one bus master to use the PCI bus at a time, and therefore asserts only one rant line from one master agent at a time. The PCI bus arbiter uses his information, together with information about an address phase (described below) to determine that a message is superimposed on the arbitration lines. The message may include status information known by the Host Bridge 502, but not by the Expansion Bridge 503.

Typically, every PC transaction begins with an address phase one PCI clock period in duration. During the address phase, the initiator (or master agent) identifies t address of the target agent. At the same time, the initiator may identify he type of transaction by driving the command type onto the PCI Command/Byte Enable bus. The initiator may assert the FRAME# signal to indicate the presence of a valid start address and transaction type on the bus. Typically, the FRAME# signal is asserted at the start of the address p se and remains asserted until the initiator is ready (by asserting IRDY# to complete the final data phase. Upon the completion of the address phase, the address/data bus is then used to transfer data in each of the phases.

Therefore, an address phase (i.e., first PCI clock cycle that the FRAME# signal is asserted) that may be identified as being initiated by the Host-PCI Bridge 601 ay be used to indicate the start of a message that transmits status information from the Host-PCI Bridge 601 to the PCI-ISA Bridge 602. FIGS. 7 through 10 may be used to more clearly illustrate the relationship between e address phase (i.e., the FRAME# signal and the PCI clock) and the arbitration signals (i.e., PHOLD# and PHLDA#) to transmit status information.

Figure 7:
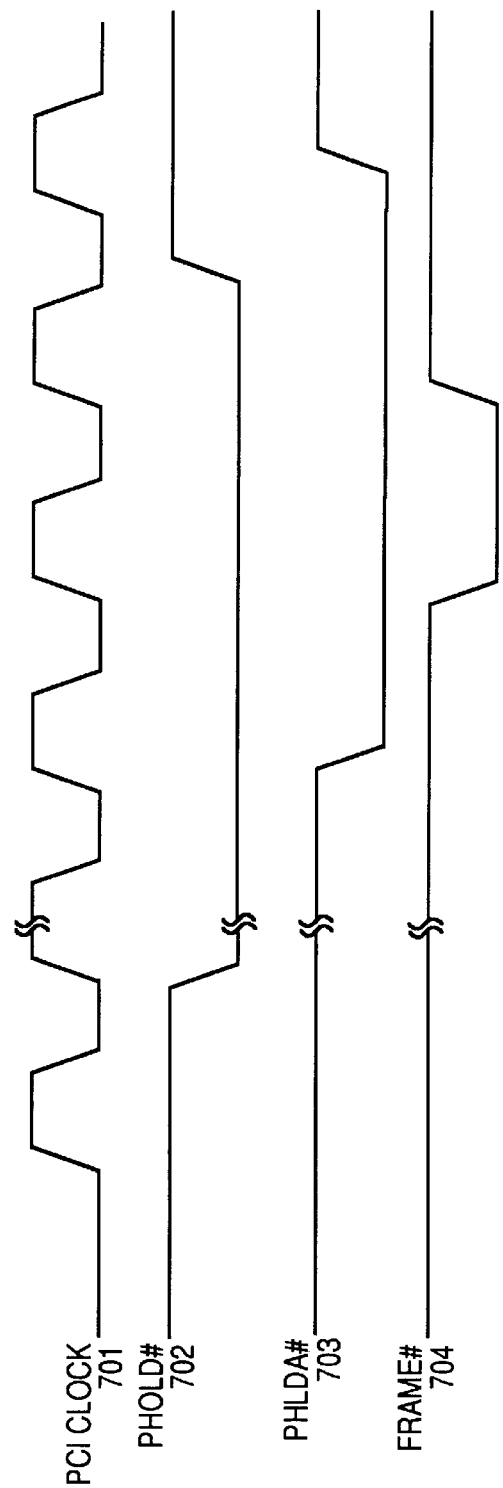
FIG. 7 illustrates a condition when address phase and the arbitration signals allow are used for arbitration for one embodiment.

FIG. 7 illustrates when the PHOLD# and the PHLDA# signals are used as request and grant signals for the PCI bus (i.e., to arbitrate for the PCI bus). The PCI clock signal 701 illustrates that the PHLDA# signal 703 is asserted (by the PCI arbiter) some indeterminate amount of time after the PHOLD# signal 702 is asserted (by the PCI-ISA Bridge 602) in order to grant the PCI-ISA Bridge 602 ownership of the PCI Bus. At some time later, the FRAME# signal 704 is asserted. Because the PHLDA# signal 703 is asserted before the FRAME# signal 704 is asserted, the Host-PCI Bridge 601 identifies the transact on as one initiated by the PCI-ISA Bridge 602. In this case, the grant signal (PHLDA#) drives the address phase. This is typically how the PHOLD# signal 702 and the PHLDA# signal 703 are used as arbitration signals.

For one embodiments the arbitration signals PHOLD# and PHLDA# may be used to pass status information from the Host-PCI Bridge to the PCI-ISA Bride. A protocol that uses the address phase (i.e., the PCI clock and the FRAME# signal) and the arbitration signals (i.e., PHOLD# and PHLDA#) during a condition that typically does not occur during arbitration may be used to pass the status information.

Figure 8:
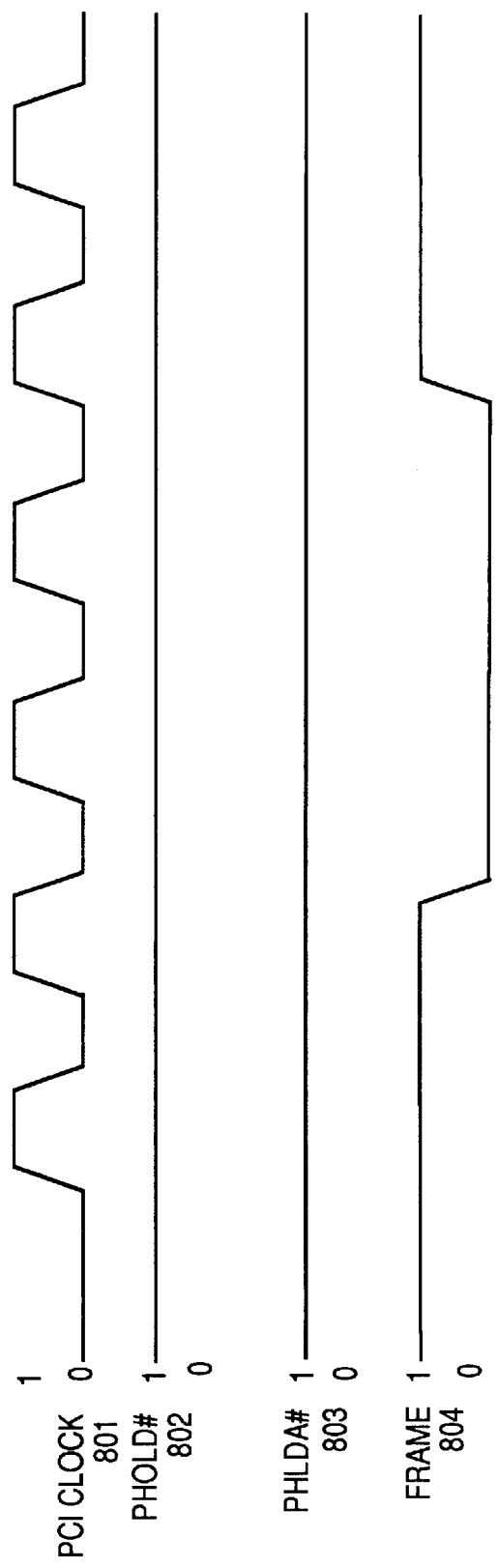
FIG. 8 illustrates a condition when the address phase and the arbitration signals are neither used for arbitration nor to pass status information for one embodiment.

FIG. 8 illustrates the condition when the PHOLD# and PHLDA# signals are not used for arbitration purposes and are not used to pass status information. The PCI Clock signal 801 illustrates that the FRAME# signal is asserted while the PHOLD# signal 802 and the PHLDA# signal 803 are not asserted. This condition informs the HOST-PCI Bridge 601 that the PCI-ISA Bridge 602 did not initiate the transaction. Thus, in this case, no status information is passed to PCI-ISA Bridge 602.

Figure 9:
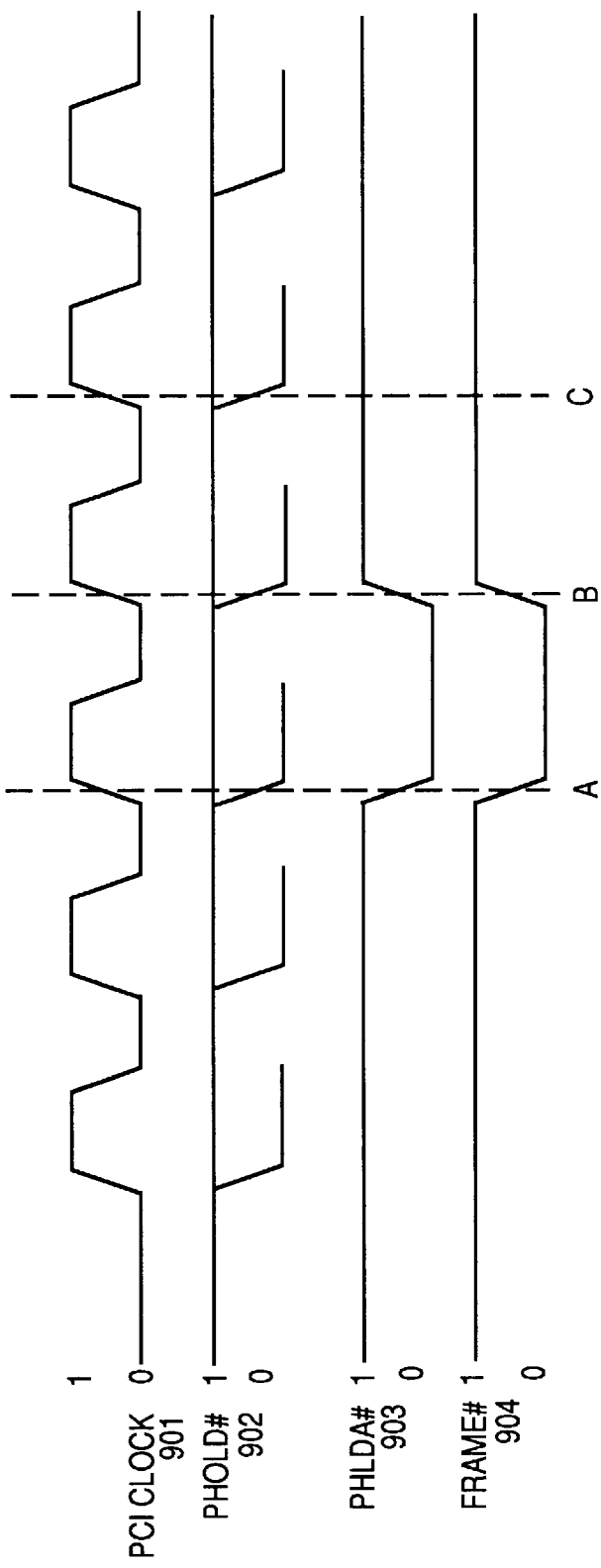
FIG. 9 illustrates a condition when the address phase and the arbitration signals are used to pass a first state of the status information for one embodiment.

FIGS. 9 and 10 are used to illustrate the conditions for passing the status information via the PHLDA# signal. FIG. 9 illustrates that the PHOLD# signal 902 may be reasserted or asserted while the PHLDA# signal 903 and the FRAME# signal 904 are asserted at the time index A. During arbitration between the HOST-PCI Bridge 601 and the PCI-ISA Bridge 602, the FRAME# signal 904 and the PHLDA# signal 903 typically should never be asserted at the same time (i.e. between time index A and B). The expansion bridge (e.g., PCI-ISA Bridge 602) may recognize this as a transaction initiated by the CPU via the Host Bridge (e.g., HOST-PCI Bridge 601). Once the FRAME# signal 904 is deasserted (e.g., PCI clock cycle), the logic state of the PHLDA# signal 903 may be used to pass status information. For alternative embodiments, the FRAME# signal 904 may be deasserted for more than one PCI clock cycle. For one embodiment, the PCI clock cycle between the time index B and C may be used to indicate that the status information has a logic high state. The logic high state may indicate a false state (i.e., no state transmitted) if the status information has an active lo state or a true state (i.e., state transmitted) if the status information has an active high state. For alternative embodiments, more than on PCI clock cycle may be used to pass status information. Furthermore, the status information may include more than one bit of data.

Similarly FIG. 10 illustrates that the PHOLD# signal 1002 may be asserted or deasserted while he PHLDA# signal 1002 and the FRAME# signal 1004 are asserted at the time index A. Once again, the PCI-ISA Bridge 602 may recognize this as a transaction initiated by the CPU via the HOST-PCI Bridge 601. Once the FRAME# signal 1004 is deasserted, the logic state of the PHLDA# signal 1003 may be used to pass status information. For one embodiment, the PCI clock cycle between the time index B and C may be used to indicate that the status information has a logic high state. The logic low state may indicate a false state (i.e., no state transmitted) if the status information has an active high state or a true state (i.e., state transmitted if the status information has an active low state. For alternative embodiments, more than one PCI clock cycle may be used to pass status information. Furthermore, the status information may include more than one bit of data.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A computer system comprising:
    a first bus;
    a first bus agent coupled to said first bus, said first bus agent is operable to generate a first arbitration signal;
    a second bus agent coupled to said first bus; and
    a bus arbitration circuit coupled to said first bus and operable to generate a second arbitration signal, wherein during a transaction initiated by said first bus agent, said second arbitration signal, when asserted, indicates said first bus agent is granted ownership of said first bus, and during a transaction initiated by said second bus agent, said second arbitration signal, when asserted, indicates a first state of a status information, and said second arbitration signal, when deasserted, indicates a second state of said status information.

2. The computer system of claim 1, wherein said bus arbitration circuit resides within said second bus agent.

3. The computer system of claim 1, further comprising a second bus coupled to said first bus agent.

4. The computer system of claim 1, wherein said first bus is a pre-emptible bus.

5. The computer system of claim 3, wherein said second bus is a non-pre-emptible bus.

6. The compute system of claim 1, wherein said first bus agent is an expansion bridge.

7. The computes of claim 6, wherein said expansion bridge is a PCI-to-ISA expansion bridge.

8. The computer system of claim 1, wherein said second bus agent is a host bridge.

9. The computer system of claim 8, wherein said host bridge is a Host-to-PCI bridge.

10. The computer system of claim 1, wherein said first arbitration signal is a PHOLD# signal and said second arbitration signal is a PHLDA# signal.

11. A computer system comprising:
    a first bus;
    a first bus agent coupled to said first bus, said first bus agent is operable to generate a first arbitration signal;
    a second bus agent coupled to said first bus;
    a bus arbitration circuit coupled to said first bus and operable to generate a second arbitration signal, wherein during a transaction initiated by said first bus agent, said second arbitration signal, when asserted, indicates said first bus agent is granted ownership of said first bus, and during a transaction initiated by said second bus agent, said second arbitration signal, when asserted, indicates a first state of a status information, and said second signal, when deasserted, indicates a second state of said status information; and wherein said first bus agent initiates a first transaction when said first arbitration signal and said second arbitration signal are asserted before an address phase, and wherein said second bus agent initiates a second transaction when said first arbitration signal is deasserted and said second arbitration signal is asserted during said address phase.

12. The computer system of claim 11, wherein said address phase occurs during a first click cycle that a FRAME# signal is asserted.

13. The computer system of claim 1, wherein said second bus agent includes a storage device, and wherein during said transaction initiated by said first bus agent, said bus arbitration circuit provides said second arbitration signal in response to said first arbitration signal and after said storage device is flushed.

14. The computer system of claim 1, wherein said first state of said status information indicates a first LOCK# state and said second state of said status information indicates a second LOCK# state.

15. A computer system comprising:
a first pair of arbitration transmission lines;
a second pair of arbitration transmission lines;
an atomic access transmission line;
a bus agent;
a first bridge; and
a second bridge coupled to said first bridge via said first pair of arbitration transmission lines, said second bridge is further coupled to said bus agent via said second pair of arbitration transmission lines and said atomic access transmission line, wherein said first bridge is coupled to receive an atomic access signal via said first pair of arbitration transmission lines and said second bridge is coupled to receive said atomic access signal via said atomic access transmission line.

16. The computer system of claim 15, wherein said first pair of arbitration transmission lines include a PHOLD# line and a PHLDA# line.

17. The computer system of claim 15, wherein said second pair of arbitration transmission lines include a REQ# line and a GNT# line.

18. The computer system of claim 15, wherein said atomic access transmission line includes a LOCK# line.

19. The computer system of claim 15, further comprising a plurality of PCI bus transmission is, wherein said plurality of PCI bus transmission lines is couples to said first bridge, said second bridge, and said PCI agent.

20. The computer system of claim 15, wherein said bus agent is a PCI agent, said first bridge is a PCI-to-ISA expansion bridge, and said second bridge is a host-to-PCI bridge.

21. A method of superimposing status information from a first bridge onto an arbitration signal received by a second bridge, comprising:
(a) deasserting, if necessary, a first arbitration signal during at least a first clock cycle;
(b) asserting a second arbitration signal during at least said first clock cycle;
(c) providing an address phase during at least said first clock cycle; and
(d) during at least second clock cycle, deasserting said second arbitration signal to indicate a first state of said status information or asserting said second arbitration signal to indicate a second state of said status information.

22. The method of claim 21, wherein said first arbitration signal is a PHOLD# signal and the second arbitration signal is a PHLDA# signal.

23. The method of claim 22, wherein said first clock cycle and said second clock cycle are clock cycles.

24. The method of claim 23, wherein said first state of said status information indicates a PCI master agent has a lock on said PCI bus for an atomic series of transactions and said second state of said status information indicates said PCI master agent does not have lock on said PCI bus for said atomic series of transactions.

* * * * *

UNITED STATES PATENT AND TRADEMARK OFFICE
CERTIFICATE OF CORRECTION

PATENT NO. : 6,529,980 B1
DATED : March 4, 2003
INVENTOR(S) : Abramson

It is certified that error appears in the above-identified patent and that said Letters Patent is hereby corrected as shown below:

Title page,
Item [57], ABSTRACT,
Line 15, delete "where", insert -- when --.

Column 1,
Line 19, delete "s stem", insert -- system --.

Column 2,
Line 21, delete "gent", insert -- agent --.
Line 34, delete "w th", insert -- with --.
Line 37, delete "he", insert -- the --.

Column 4,
Line 11, delete "attempt", insert -- attempts --.
Line 33, delete "end", insert -- and --.
Line 47, delete "Bits", insert -- Bus --.
Line 66, delete "uses", insert -- buses --.

Column 5,
Line 1, delete "lease", insert -- release --.
Line 31, delete "feature", insert -- features --.
Line 37, delete "he", insert -- the --.
Line 52, delete "o e", insert -- one --.

Column 6,
Line 21, delete "t e", insert -- the --.
Line 23, delete "operation", insert -- operations --.
Line 32, delete "ay", insert -- may --.
Line 35, delete "r side", insert -- reside --.
Line 37, delete "ridge", insert -- Bridge --.
Line 40, delete "pi", insert -- put --.
Line 54, delete "there ore", insert -- therefore --.
Line 55, delete "th", insert -- the --.

Column 7,
Line 5, before "time", insert -- a --.
Line 28, delete "ant", insert -- and --.
Line 30, delete "gene ally", insert -- generally --.
Line 59, delete "he", insert -- the --.

UNITED STATES PATENT AND TRADEMARK OFFICE
CERTIFICATE OF CORRECTION

PATENT NO. : 6,529,980 B1
DATED : March 4, 2003
INVENTOR(S) : Abramson

It is certified that error appears in the above-identified patent and that said Letters Patent is hereby corrected as shown below:

Column 8,
Line 4, delete "s stem", insert -- system --.
Line 36, before "request", insert -- a --.
Line 41, delete "line", insert -- lines --.
Line 44, delete "rant", insert -- grant --.
Line 45, delete "his", insert -- this --.
Line 52, delete "t", insert -- the --.
Line 54, delete "he", insert -- the --.
Line 58, delete "p se", insert -- phase --.
Line 62, before "phases", insert -- data --.
Line 65, delete "ay", insert -- may --.

Column 9,
Line 2, delete "e", insert -- the --.
Line 16, delete "transact on", insert -- transaction --.
Line 41, delete "reasserted", insert -- deasserted --.
Line 65, delete "he", insert -- the --.

Column 10,
Line 9, after "transmitted", insert -- ) --.

Signed and Sealed this

Twelfth Day of August, 2003

JAMES E. ROGAN
*Director of the United States Patent and Trademark Office*